United States Patent
Lounder et al.

(10) Patent No.: US 10,531,608 B2
(45) Date of Patent: Jan. 14, 2020

(54) KNIFE DRIVE ASSEMBLY FOR AN AGRICULTURAL HARVESTER

(71) Applicant: CNH Industrial America LLC, New Holland, PA (US)

(72) Inventors: Josh Lounder, Honeybrook, PA (US); Donald Keller, Narvon, PA (US); Robert D. Crandall, Lancaster, PA (US); Doug Sorensen, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 442 days.

(21) Appl. No.: 15/403,877

(22) Filed: Jan. 11, 2017

(65) Prior Publication Data

US 2018/0192582 A1    Jul. 12, 2018

(51) Int. Cl.
*A01D 34/30* (2006.01)

(52) U.S. Cl.
CPC ................... *A01D 34/30* (2013.01)

(58) Field of Classification Search
CPC ........ A01D 34/30; A01D 34/13; A01D 41/14; A01D 34/04; A01D 34/145; A01D 34/404; A01D 34/02; A01D 34/135; A01D 34/283
See application file for complete search history.

(56) References Cited

U.S. PATENT DOCUMENTS

| | | | |
|---|---|---|---|
| 370,762 A | 10/1887 | Bunch | |
| 536,695 A | 4/1895 | Hall | |
| 712,500 A | 11/1902 | Colewell | |
| 1,230,710 A * | 6/1917 | Hill | A01D 34/02 56/2 |
| 1,351,939 A * | 9/1920 | Andre | A01D 34/08 180/19.1 |
| 1,880,121 A * | 9/1932 | Chadbourne | A01D 34/30 56/262 |
| 2,630,670 A | 3/1953 | Sherman | |
| 2,724,941 A | 11/1955 | Zwiesler | |
| 3,731,477 A * | 5/1973 | Coon | A01D 45/263 56/327.1 |
| 3,763,638 A * | 10/1973 | Vogelenzang | A01D 34/30 56/293 |
| 3,763,639 A * | 10/1973 | Grillot | A01D 34/30 56/296 |
| 3,973,378 A * | 8/1976 | Bartasevich | A01D 34/37 56/11.9 |
| 4,267,689 A * | 5/1981 | Schneider | A01D 45/021 56/53 |

(Continued)

FOREIGN PATENT DOCUMENTS

| | | | | |
|---|---|---|---|---|
| CA | 948859 A | * | 6/1974 | ............. A01D 34/13 |
| DE | 2709809 A1 | * | 10/1977 | ............. A01D 34/04 |

*Primary Examiner* — Arpad Fabian-Kovacs
(74) *Attorney, Agent, or Firm* — Peter K. Zacharias; Patrick M. Sheldrake

(57) ABSTRACT

A knife drive assembly for use with a header of an agricultural harvester is provided. The knife drive assembly includes a housing, a rotatable driver having at least one curved channel or sloped lateral side, at least one wobble arm engaging the curved channel and a at least one mounting bar that engages the wobble arm and a cutter bar such that when the rotatable driver is rotated, the cutter bar engages in substantially linear oscillating motion.

16 Claims, 12 Drawing Sheets

(56) References Cited

U.S. PATENT DOCUMENTS

| | | | | |
|---|---|---|---|---|
| 4,901,512 | A * | 2/1990 | Castoldi | A01D 34/13 56/293 |
| 7,478,522 | B1 * | 1/2009 | Lovett | A01D 41/14 56/296 |
| 7,810,304 | B2 * | 10/2010 | Priepke | A01D 34/30 56/257 |
| 8,011,272 | B1 * | 9/2011 | Bich | A01D 34/305 56/299 |
| 8,151,547 | B2 | 4/2012 | Bich et al. | |
| 9,545,052 | B2 * | 1/2017 | Cook | A01D 34/30 |
| 9,622,409 | B2 * | 4/2017 | Coers | A01D 41/14 |
| 2011/0099964 | A1 * | 5/2011 | Coers | A01D 41/14 56/296 |
| 2014/0109536 | A1 * | 4/2014 | Boeck | F16H 7/1281 56/14.7 |
| 2014/0190139 | A1 * | 7/2014 | Cook | A01D 34/145 56/10.1 |

\* cited by examiner

US 10,531,608 B2

KNIFE DRIVE ASSEMBLY FOR AN AGRICULTURAL HARVESTER

FIELD OF THE INVENTION

The present invention relates generally to a knife drive assembly for a header of a plant-cutting machine (e.g., a combine harvester) and more specifically to a knife drive assembly suitable for mounting to a rotatable driver for providing linear reciprocating motion to a knife head.

BACKGROUND OF THE INVENTION

Agricultural harvesters, such as combine harvesters or tractors, are well known apparatuses for harvesting crops. An agricultural harvester is typically a self-propelled vehicle which includes a feederhouse and mechanisms downstream of the feederhouse for separating grain from other crop material. A header is attached to the front of the harvester and includes mechanisms for cutting crop, gathering crop and delivering crop to the harvester's feederhouse. A typical crop cutter includes a stationary component, such as a knife, and a moving knife which together act as shears that cut crop near the ground. After cutting, the crop is gathered, e.g., by a harvesting reel which feeds the cut crop to a conveyor system that transports the cut crop to the harvester's feederhouse.

Typical agricultural harvester cutter assemblies include a pair of oppositely directed knife blades, also known as cutter bars or knife assemblies, each of which are formed from a plurality of knife sections that are secured to a knife back. Each knife back, in turn, is connected to a knife drive. In conventional cutter assemblies the knife blades are pivotably connected to the knife drives whereby the knife drives propel the knife blades through a non-linear, arc-like path of motion. In traversing the arc, the knife blades move not only from side to side (i.e., transverse to the direction of movement of the harvester) but also fore and aft (i.e., in the direction of movement of the harvester). The fore and aft motion of the knife blades must be accommodated for clearances between parts. If these clearances are not accounted for, vibration can be introduced into the cutter assemblies which adds additional stresses on the knife blades and detrimentally affects the service life of the knife drives.

In addition, the knife drives of current agricultural harvesters are complex in construction with many moving parts including multiple crank shafts and gears. In a typical arrangement, at least one crank shaft and gear is required to drive each knife blade. Additionally, the interaction of these components must be carefully coordinated in order to move the knife blades in synchronicity. The complexity of such knife drives renders them difficult and costly to manufacture and repair while increasing their susceptibility to failure, which can deleteriously impact harvesting productivity.

Accordingly, what is sought is a driver assembly that is simple in design, is easier to maintain and that provides simple and predictable linear motion to connected knife blades. The disclosed invention overcomes the disadvantages referenced above by providing a knife drive with less moving parts and less vibration resulting from unneeded fore and aft motion.

BRIEF SUMMARY OF THE INVENTION

The present invention provides a knife drive assembly capable of providing straight line motion for a header of an agricultural harvester that can be located either central to or at a side of the header's cutter bar assembly.

In accordance with a first exemplary embodiment of the present invention, there is provided a knife drive assembly for an agricultural harvester header comprising a housing, a rotatable driver within the housing, a first wobble arm within the housing, and a first mounting bar spaced from the rotatable driver. The rotatable driver includes a first curved channel circumscribing the rotatable driver about a rotational axis of the rotatable driver. The first wobble arm includes a first end engaging the first curved channel and a second end opposite the first end. The first mounting bar includes a proximal end slidingly connected to the second end of the first wobble arm near the proximal end. The first mounting bar also has a first longitudinal length that extends substantially parallel to the rotational axis and through the housing. Rotation of the rotatable driver causes reciprocating motion of the first mounting bar.

An aspect of the first exemplary embodiment is that the proximal end of the first mounting bar and the second end of the first wobble arm are slidingly connected by a slotted connection. The first end of the wobble arm also comprises a roller bearing. The first wobble arm also pivots about an axis located between the first end and the second end of the first wobble arm. The knife drive assembly further comprises a first linear bearing engaging the first mounting bar. Additionally, the knife drive assembly further comprises a seal between the first mounting bar and the housing.

An additional aspect of the first exemplary embodiment is to include a second curved channel that circumscribes the rotatable driver, a second wobble arm within the housing, and a second mounting bar spaced from the rotatable driver. The second wobble arm includes a first end engaging the second curved channel and a second end opposite the first end. The second mounting bar engages the second end of the second wobble arm and has a second longitudinal length extending substantially parallel to the rotational axis and through the housing. Additionally, rotation of the rotatable driver causes reciprocating motion of the second mounting bar. A further aspect of this exemplary embodiment is that the second curved channel defines a curved path having a bend that is angularly offset from a bend in a curved path of the first curved channel by about 180° (degrees) to induce oscillating movement of the first mounting bar and second mounting bar in opposite directions.

In accordance with a second exemplary embodiment of the present invention, there is provided a header for a plant cutting machine comprising a frame, a knife drive assembly, a first cutter bar attached to a first mounting bar of the knife drive assembly and a second cutter bar attached to a second mounting bar of the knife drive assembly. The knife drive assembly includes a housing mounted to the frame, a rotatable driver, a first wobble arm pivotably attached to the frame, a second wobble arm pivotably attached to the frame, the first mounting bar spaced from the rotatable driver and the second mounting bar spaced from the rotatable driver. The rotatable driver has a first curved channel circumscribing the rotatable driver about a rotational axis of the rotatable driver and a second curved channel circumscribing the rotatable driver about the rotational axis. The first wobble arm includes a first end engaging the first curved channel and a second end opposite the first end. The second wobble arm includes a first end engaging the second curved channel and a second end opposite the first end. The first mounting bar engages the second end of the first wobble arm and has a first longitudinal length extending substantially parallel to the rotational axis and through the housing. The second mounting bar engages the second end of the second wobble arm and has a second longitudinal length extending substantially parallel to the rotational axis and through the housing. Rotation of the rotatable driver causes reciprocating motion of the first and second mounting bars.

An aspect of this exemplary embodiment is that the first and second mounting bars each include a proximal end slidingly connected to the respective second end of the first and second wobble arms by a slotted connection.

In accordance with a third exemplary embodiment of the present invention, there is provided a knife drive assembly for an agricultural harvester header comprising a housing, a rotatable driver within the housing and a first mounting bar radially offset from the rotational axis of the rotatable driver. The rotatable driver has a first sloped lateral side that traverses a rotational axis of the rotatable driver. The first mounting bar engages the first sloped lateral side and has a first longitudinal length extending through the housing substantially parallel to the rotational axis.

An aspect of the third exemplary embodiment is that the knife drive assembly further comprises a mechanical drive, such as a pulley or a motor operatively connected to the rotatable driver. Another aspect is that the rotatable driver includes a bearing surface on the first sloped lateral side. Additionally, the first mounting bar includes a proximal end having a bearing for engaging the first sloped lateral side. The knife drive assembly further comprises a biasing member biasing the first mounting bar towards the first sloped lateral side. The housing also includes a stop adjacent to the first mounting bar engaging the biasing member. The knife drive assembly may further comprise a seal between the first mounting bar and the housing.

An additional aspect of the third exemplary embodiment is to include a second sloped lateral side traversing the rotational axis of the rotatable driver and a second mounting bar radially offset from the rotational axis that engages the second sloped lateral side of the rotatable driver. The second mounting bar further includes a second longitudinal length extending through the housing substantially parallel to the rotational axis of the rotatable driver. In a further aspect of the third exemplary embodiment, the second sloped lateral side is substantially parallel to the first sloped lateral side. Alternatively, the first and second sloped lateral sides are substantially symmetric with each other about a sagittal plane transverse to the rotational axis.

Other features and advantages of the present invention will be apparent from the following more detail description of the exemplary embodiments of the present invention, taken in conjunction with the accompanying drawings which illustrate, by way of example, the principles of the invention.

BRIEF DESCRIPTION OF THE SEVERAL VIEWS OF THE DRAWINGS

The foregoing summary, as well as the following detailed description of the exemplary embodiments of the invention, will be better understood when read in conjunction with the appended drawings. For the purpose of illustrating the invention, there are shown in the drawings exemplary embodiments. It should be understood, however, that the invention is not limited to the precise arrangements and instrumentalities shown.

In the drawings.

DETAILED DESCRIPTION OF THE INVENTION

Figure 1:
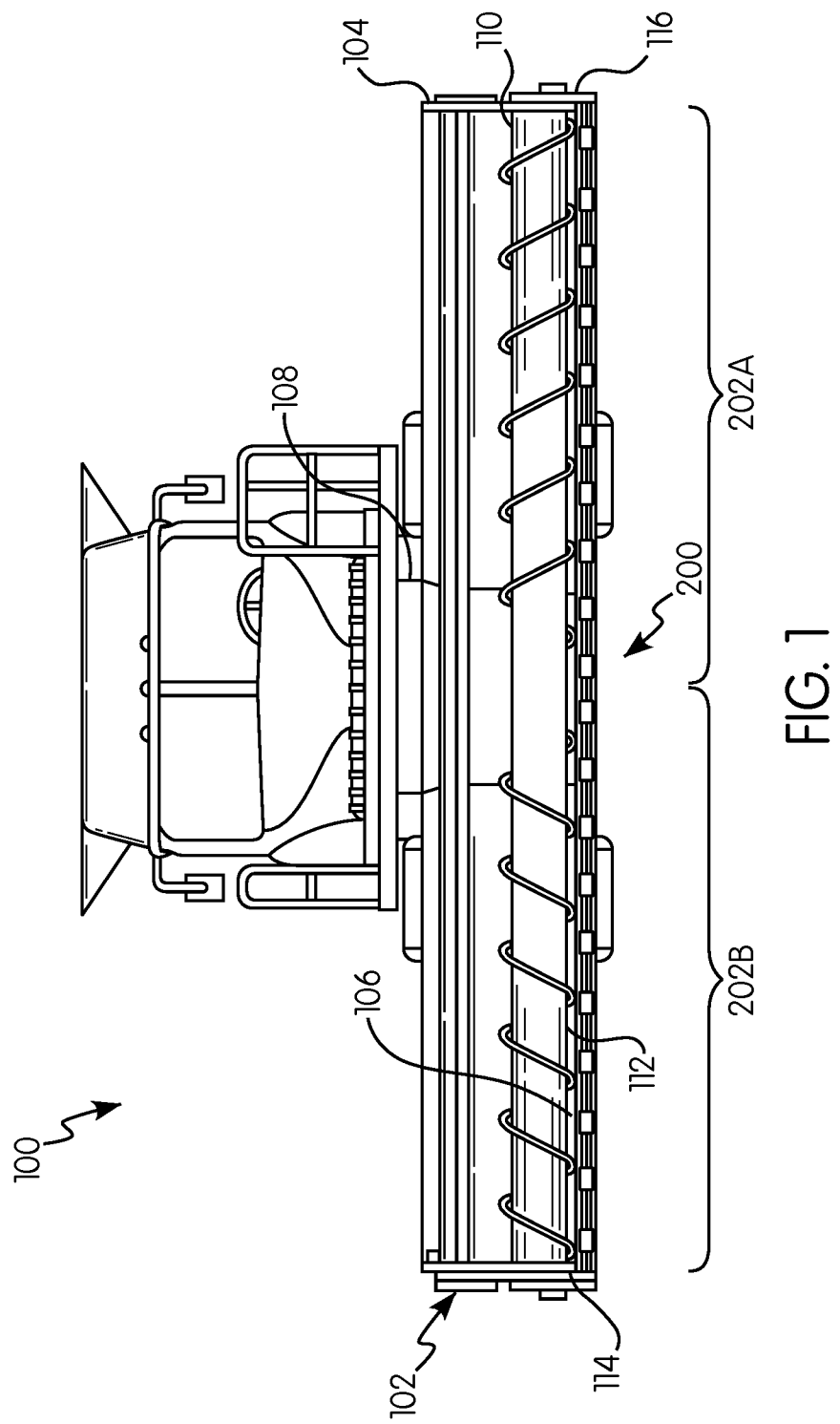
FIG. 1 is a front elevation view of an agricultural harvester including a header in accordance with an exemplary embodiment of the present invention.

Reference will now be made in detail to the various embodiments of the present invention illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the present invention in any manner not explicitly set forth. Additionally, the term "a," as used in the specification, means "at least one." The terminology includes the words above specifically mentioned, derivatives thereof, and words of similar import.

The terms "corn," "ear," "stalk," "leaf," and "crop material" are used throughout the specification for convenience and it should be understood that these terms are not intended to be limiting. Thus, "corn" refers to that part of a crop which is harvested and separated from discardable portions of the crop material. The header of the present invention is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

Throughout this disclosure, various aspects of the present invention can be presented in a range format. It should be understood that the description in range format is merely for convenience and brevity and should not be construed as an inflexible limitation on the scope of the present invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the present invention may be combined in any suitable manner in one or more embodiments. One skilled in the relevant art will recognize, in light of the description herein, that the present invention can be practiced without one or more of the specific features or advantages of a particular exemplary embodiment. In other instances, additional features and advantages may be recognized in certain embodiments that may not be present in all exemplary embodiments of the present invention.

Referring now to the drawings wherein aspects of the subject application are shown, FIGS. 1-8B illustrate an agricultural harvester 100 in accordance with an exemplary embodiment of the present invention. For exemplary purposes only, the agricultural harvester is illustrated as a combine harvester. The harvester 100 includes a header 102 having a frame 104, a knife drive assembly 300, a first cutter bar 202A and a second cutter bar 202B.

The header 102 includes a floor 106 that is supported in desired proximity to the surface of a crop field and a knife head assembly 200 that extends transversely along a forward edge of the floor 106 i.e., in a widthwise direction of the harvester 100. The knife head assembly 200 is configured to cut crops in preparation for induction into the feederhouse 108. Additionally, the header 102 can include, for example, an elongate, transversely extending harvesting reel 110 disposed above the knife head assembly 200. Harvesting reel 110 is rotatable in a direction suitable for facilitating the induction of cut crops into the feederhouse 108. The header 102 can further includes an elongate, rotatable auger which extends in close proximity to the knife head assembly 200. The auger is configured to cooperate with the harvesting reel 110 in conveying cut crops to the feederhouse 108, which is configured to convey the cut crops into the harvester 102 for threshing and cleaning. While the foregoing aspects of the harvester is being described with respect to the header shown, the knife head assembly of the subject application can be applied to any other header having use for such a knife head assembly, such as a hay mower.

Figure 2A:
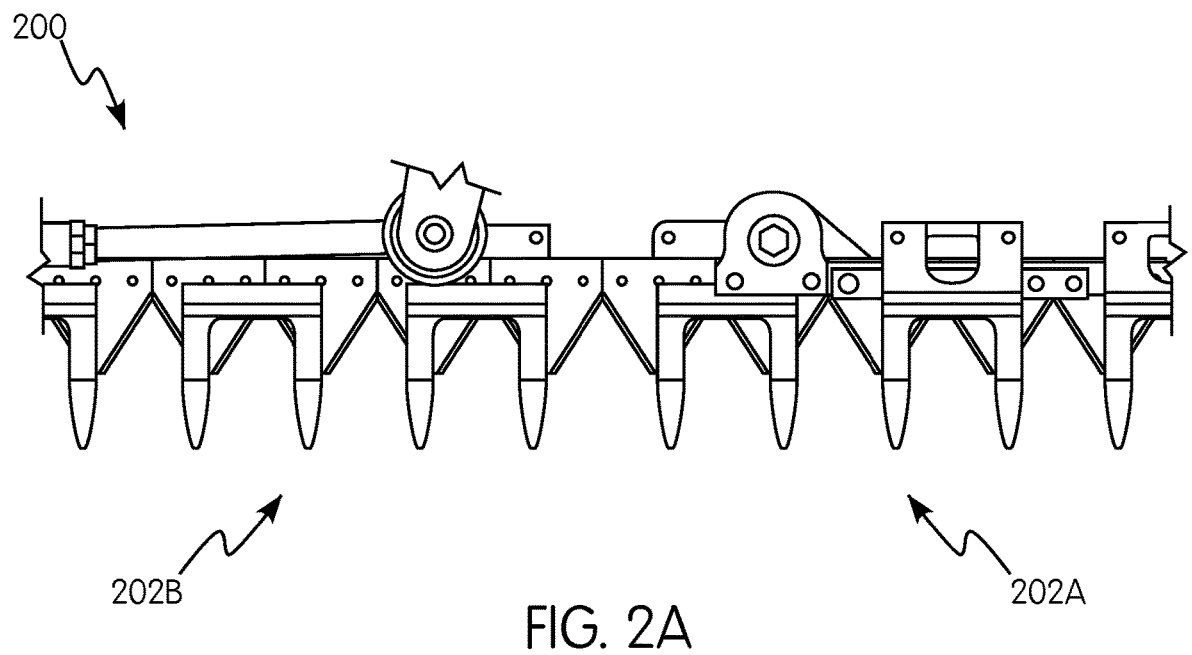
FIG. 2A is a partial top view of a knife head assembly of the agricultural harvester having a moving knife.
Figure 2B:
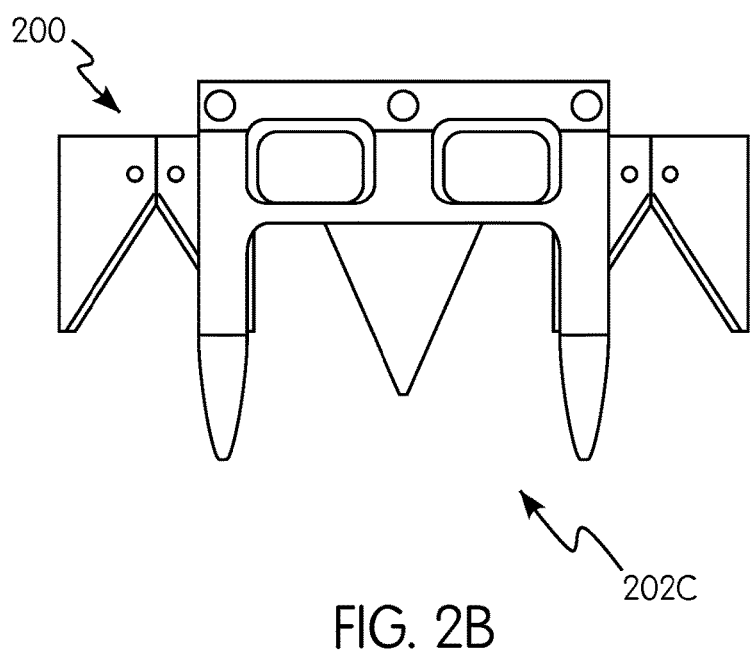
FIG. 2B is a partial top view of a knife head assembly of the agricultural harvester having a stationary knife.

The knife head assembly 200 extends along a forward edge 112 of the floor 106, and is generally bounded by a first side edge 114 and an opposing second side edge 116, both adjacent to the floor 106. Knife head assembly 200 includes a first cutter bar 202A and a second cutter bar 202B which are both independently movable from each other. FIG. 2A illustrates the first cutter bar 202A and the second cutter bar 202B. The knife head assembly 200 may additionally include a stationary component, such as a stationary knife 200C, as shown in FIG. 2B, positioned between and in side by side relation with the first cutter bar 202A and the second cutter bar 202B. The structure, function and operation of such cutter bars are known in the art and a detailed discussion of such is not necessary for a full understanding of the present invention. However, typical cutter bars applicable to the present invention are disclosed in U.S. Pat. No. 8,151, 547, the entire disclosures of which are incorporated by reference herein for all purposes.

A frame 104 of the header 102 allows for the various components of the header 102 to be attached thereto. Such header 102 frames 104 are well known in the art and do not necessitate additional discussion for the purposes of the present invention.

Referring to FIGS. 1 and 3-8B, the knife drive assembly 300 includes a housing 302 mounted to the frame 104, a rotatable driver 400, a first wobble arm 500A, a second wobble arm 500B. The rotatable driver 400 has a first curved channel 402 that circumscribes the rotatable driver 400 about a rotational axis 404 of the rotatable driver 400, and a second curved channel 406 that circumscribes the rotatable driver 400 about the rotational axis 404. The first wobble arm 500A is pivotably attached to the frame 104 and includes a first end 502A that engages the first curved channel 402 and a second end 504A opposite the first end 502A. The second wobble arm 500B is also pivotably attached to the frame 104 and includes a first end 502B that engages the second curved channel 406 and a second end 504AB opposite the first end 502B.

The knife drive assembly 300 further includes a first mounting bar 600A and a second mounting bar 600B. The first mounting bar 600A is spaced from the rotatable driver 400 and engages the second end 504A of the first wobble arm 500A. The first mounting bar 600A also has a longitudinal length that extends substantially parallel to the rotational axis 404 and through the housing 302. The first mounting bar 600A is connected to the first cutter bar 202A. The second mounting bar 600B is also spaced from the rotatable driver 400 and engages the second end 504AB of the second wobble arm 500B. The second mounting bar 600B also has a longitudinal length that extends substantially parallel to the rotational axis 404 and through the housing 302. The second mounting bar 600B is connected to the second cutter bar 202B.

The header 102 is attached to a forward end of the harvester 100 and configured to cut crops, including (without limitation) small grains (e.g., wheat, soybeans, corn, etc.), and to induct the cut crops into a feederhouse 108 as the harvester moves forward over a crop field.

Figure 3:
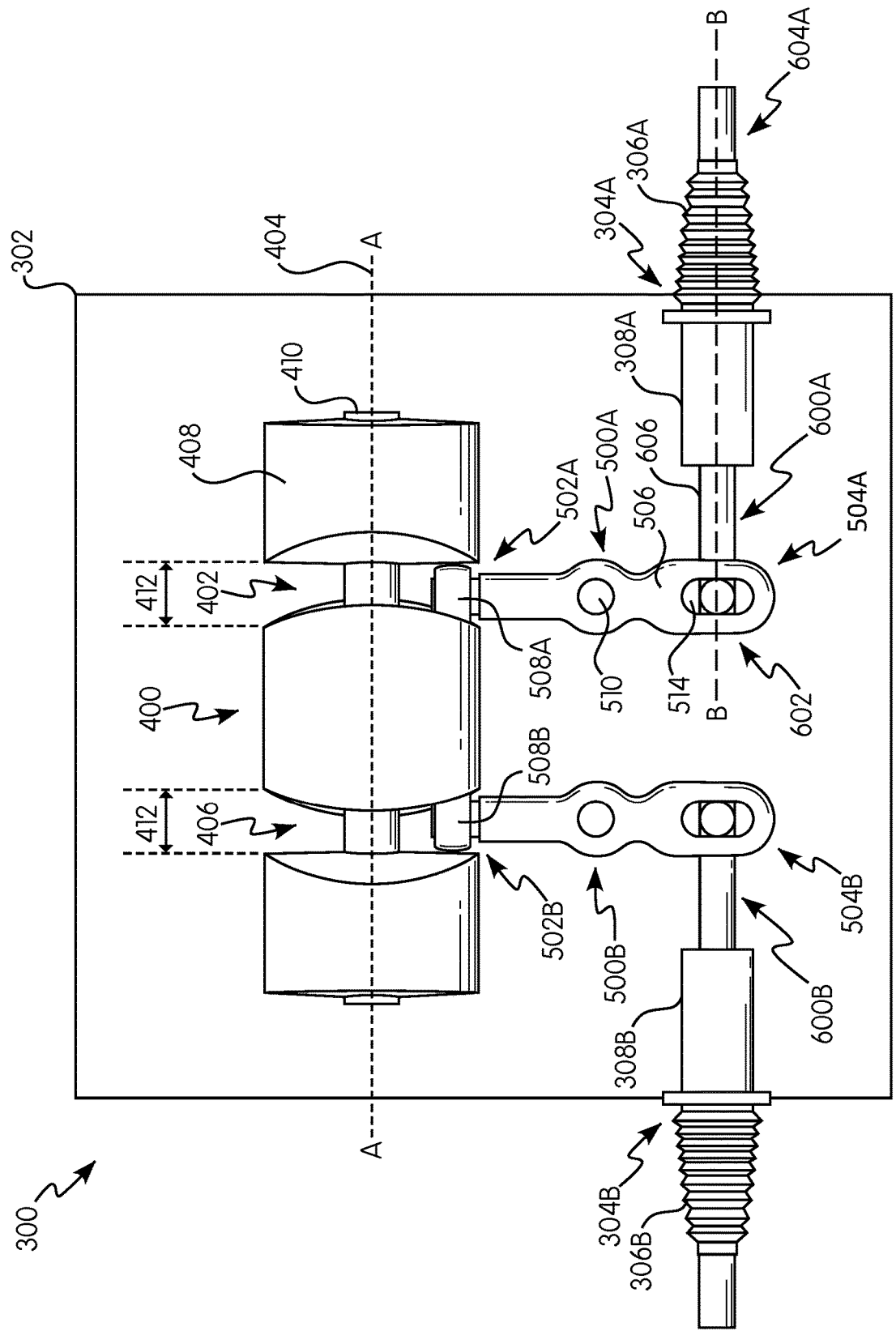
FIG. 3 is a partial perspective view of a knife drive assembly in accordance with an exemplary embodiment of the present invention applicable to the header of FIG. 1.

With reference now to FIG. 3, the housing 302 is attached to the frame 104 at or centrally of the header 102. The housing 302 has an inner volume for housing some or all the components of the knife drive assembly 300. The housing 302 further has a series of connectors or openings for operatively connecting the components of the knife drive assembly 300 to other parts of the header 102 including, but not limited to, one or more openings 304A, 304B for the first and second mounting bars 600A, 600B. It is appreciated, however, that the housing 302 can be an integral component of the frame 104 or may instead be the frame 104 itself.

The knife drive assembly 300 can further include seals 306A, 306B positioned adjacent to the housing 302 and respective openings 304A, 304B to prevent debris, such as material other than grain, from entering the housing 302. Examples of seals 306A, 306B applicable to the present embodiment include bellows or covers which can be formed from any suitable material, for example a metal or a polymer, such as an elastomer. The seals 306A, 306B also have appropriate openings or attachment mechanisms to receive the respective first and second mounting bars 600A, 600B. Each seal is preferably configured as shown in FIG. 3 and positioned between one of the first and second mounting bars 600A, 600B and the housing 302. In accordance with an aspect of the present embodiment, the seals 306A, 306B are configured as frustoconical shaped bellows. Put differently, the knife drive assembly 300 further comprises a seal 306A between the first mounting bar 600A and the housing 302.

Additionally, to facilitate sliding of the first and second mounting bars 600A, 600B within the housing 302, there may be provided linear bearings 308A, 308B. Each linear bearing 308A, 308B is configured to engage the respective first and second mounting bar 600A, 600B. The linear bearings 308A, 308B are preferably positioned adjacent to the housing 302 and/or in-line with a respective openings 304A, 304B. Alternatively, the linear bearings 308A, 308B can be built into the housing 302 and/or form an opening through which a respective first and second mounting bar 600A, 600B can extend through the housing 302. In an alternate aspect, the linear bearings 308A, 308B may instead be located outside of the housing 302 further down the connections of the first and second mounting bars 600A, 600B such as, for example, near the first and second cutter bars 202A, 202B. The linear bearings 308A, 308B function to permit only linear motion of the first and second mounting bars 600A, 600B and consequently, of the first and second cutter bars 202A, 202B. Put differently, the knife drive assembly 300 further comprises a first linear bearing 308A engaging to the first mounting bar 600A.

Figure 4A:
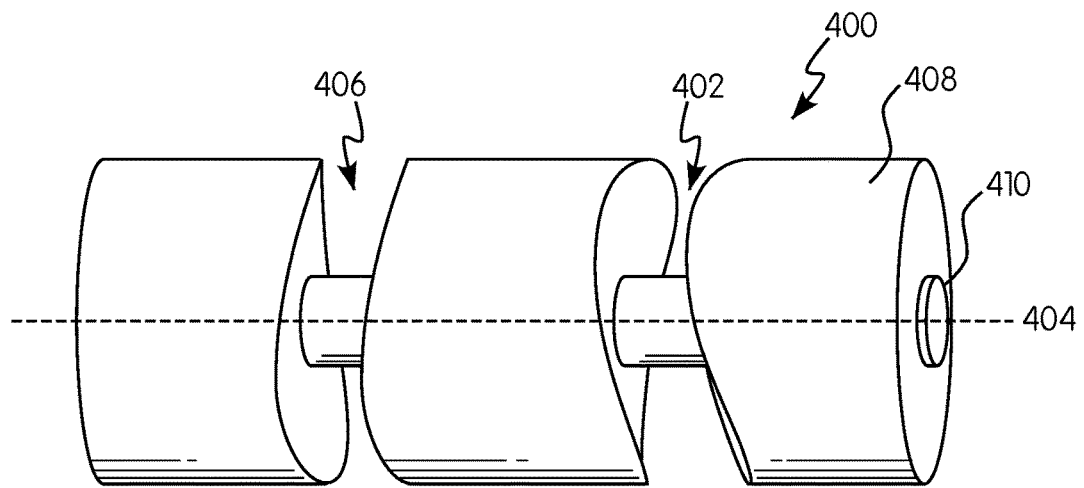
FIG. 4A is a partial perspective view of a rotatable driver of the knife drive assembly of FIG. 3.
Figure 4B:
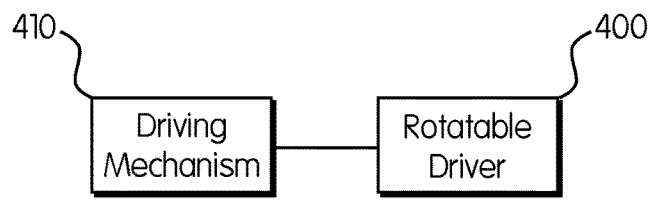
FIG. 4B is a schematic view of the connection between a driving mechanism and a rotatable driver of the knife drive assembly of FIG. 3.
Figure 4C:
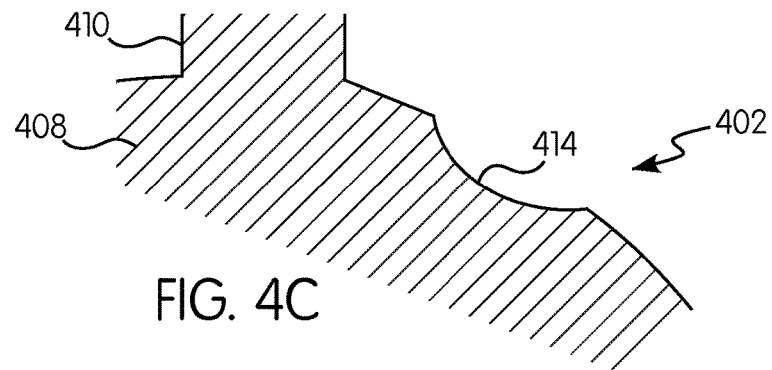
FIG. 4C is a partial cross-sectional view of an inner wall of a curved channel of the rotatable driver of FIG. 4A taken along lines A-A in accordance with an exemplary embodiment of the present invention.
Figure 4D:
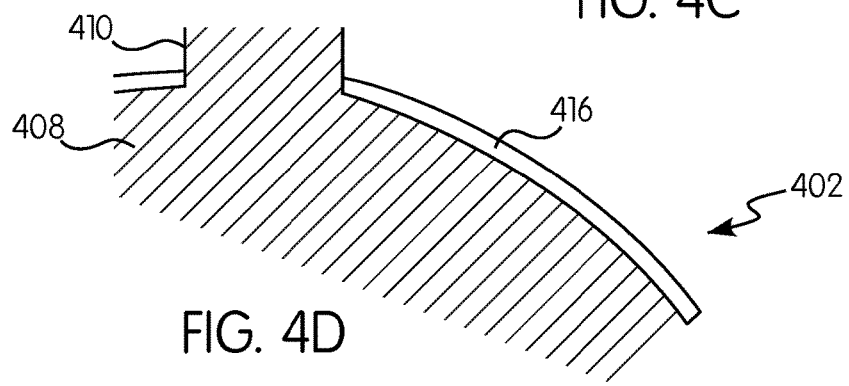
FIG. 4D is a partial cross-sectional view of an inner wall of a curved channel of the rotatable driver of FIG. 4A taken along lines A-A in accordance with an exemplary embodiment of the present invention.

Referring now to FIGS. 3-4A, the rotatable driver 400 is configured as shown. The rotatable driver 400 includes a cylindrical body 408 that is operatively connected to a driving mechanism 410, as schematically shown in FIG. 4B. The cylindrical body 408 includes a first curved channel 402 and a second curved channel 406 each circumscribing the cylindrical body 408 about the rotational axis 404. It is appreciated however, that the cylindrical body 408 may be any other shape as appropriate for having curved channels and capable of being rotated.

Preferably, the first and second curved channels 402, 406 are spaced apart. The first and second curved channels 402, 406 are curved such that a circumference of each of the first and second curved channels 402, 406 is not planar. In other words, the first and second curved channels 402, 406 travel along a longitudinal direction having a travel path 412 of about 3 inches in a longitudinal direction that is parallel to the rotational axis 404 of the rotatable driver 400. However, the first and second curved channels 402, 406 may have a larger or smaller horizontal travel path 412, depending on the needed distance of travel of the knife head assembly 200 in the header 102. For example, the travel path 412 distance along the longitudinal direction may be about 1, 2, 4, 5, 6, 7, 8, 9, 10 or more than 10 inches.

Figure 8A:
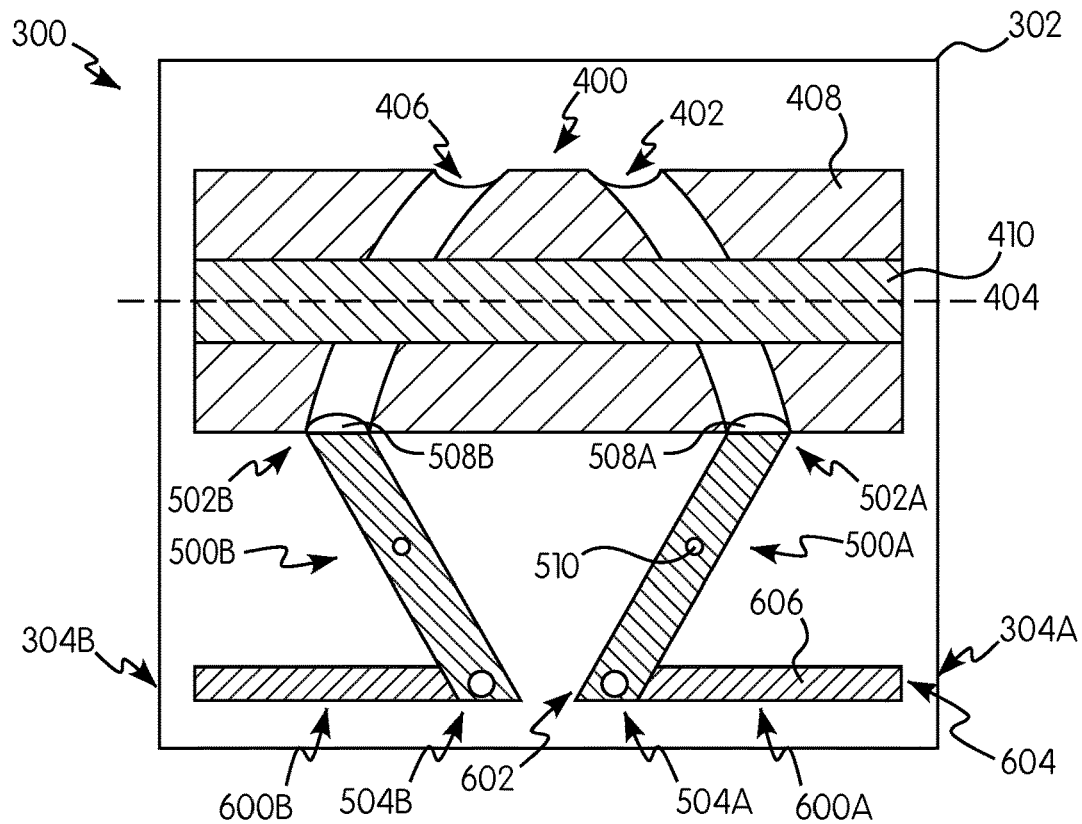
FIG. 8A is a schematic top cross-sectional view of the knife drive assembly of FIG. 3 taken along lines A-A.

In accordance with an aspect of the present invention, the first and second curved channels 402, 406 are angularly offset from each other by about 180° such that the travel path 412 of each curved channel 406, 408 curves in opposite directions with respect to each other, as shown in FIG. 8A. However, the first and second channels 406, 408 may be angularly offset by more or less than 180° such as about 10°, 20°, 30°, 40°, 50°, 60°, 70°, 80°, 90°, 100°, 110°, 120°, 130°, 140°, 150°, 160°, and 170°. Put differently, the second curved channel 406 defines a curved path having a bend that is angularly offset from a bend in a curved path of the first curved channel 402 by about 180 degrees to induce oscillating movement of the first mounting bar 600A and the second mounting bar 600B in opposite directions.

It is appreciated that while the present embodiment calls for "curved" channels, the invention is not necessarily limited as such. The curved channels could instead be angled channels or have any other such configuration that will operate in substantially the same way.

In accordance with another aspect of the present invention, the rotatable driver 400 may instead have more or less than two (2) curved channels. For example, the rotatable driver 400 may alternatively have a single curved channel or may have a third curved channel for engaging a driving mechanism or a separate output shaft. The curved channels could also include grooves 414, such as those shown in FIG. 4C, bearings 416, such as those shown in FIG. 4D and other features for engaging components of the knife drive assembly 300 including, but not necessarily limited to rivets, and bushings.

The driving mechanism 410 is any mechanism that is capable of rotating the rotatable driver 400 about its rotational axis 404 which extends parallel to the longitudinal length of the cylindrical body 408. This may include, but is not necessarily limited to, a motor, a power take-off, a hydraulically powered drive mechanism or other such sources capable of generating rotational motion. Other such exemplary drive mechanisms include gears or pulleys arranged in different formats. For example, the rotatable driver 400 may be operably connected to a pulley system having a pulley circumscribing the rotatable driver 400 in a third channel.

Figure 5A:
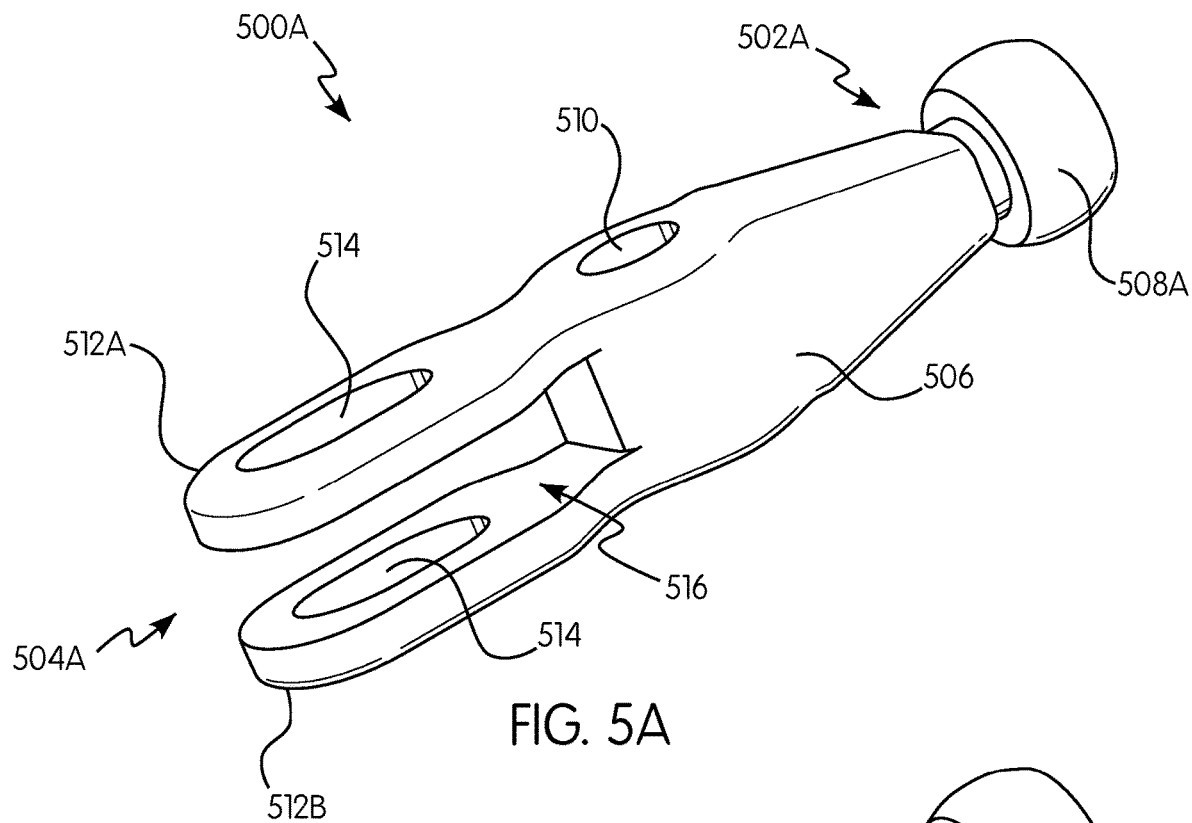
FIG. 5A is a partial perspective view of a wobble arm of the knife drive assembly of FIG. 3.

With reference now to FIGS. 3 and 5A, the first wobble arm 500A is configured as shown. The first wobble arm 500A includes an elongated body 506 having a first end 502A and a second end 504A opposite the first end 502A. The first end 502A includes a bearing 508A designed to fit within the first curved channel 402 of the rotatable driver 400. In accordance with an exemplary embodiment, the bearing 508A has a curved outer surface so as to minimize surface area contact when engaged within the first curved channel 402.

The bearing 508A can also be ring shaped to allow for mounting onto a dowel at first end 502A of the elongated body 506. As such, the ring shaped bearing 508A rotates about the dowel as it engages the first curved channel 402. Furthermore, in accordance with another exemplary embodiment, the bearing 508A may be configured with a substantially spherically shaped inner surface for mounting to a substantially spherical shaped end of the elongated body 506.

The bearing 508A is a roller bearing that is mounted to a tip of the first end 502A and rotates about the tip. Alternatively the bearing 508A can be any other bearing suitable for slidingly engaging (i.e. non-rotating) or rolling within a curved channel of the rotatable driver 400. The bearing 508A can be made from any material suitable for its intended use, e.g. a composite, such as a ceramic, or metal, and have grooves, rivets or other such features for engaging the first curved channel 402.

The first wobble arm 500A further includes a pivot 510A, such as an opening for receiving a pivot joint. The pivot 510A is positioned about a mid-point of the elongated body 506 and preferably configured as a through-hole.

The second end 504A is configured as a pair of spaced apart members 512A, 512B. The spaced apart members 512A, 512B each have an aperture 514. The aperture 514 is preferably configured as a through-hole having an oval shape or elongated slotted shape. Extending between and formed by the spaced apart members 512A, 512B is a slot 516 for receiving a part of the first mounting bar 600A, discussed in greater detail below.

Figure 5B:
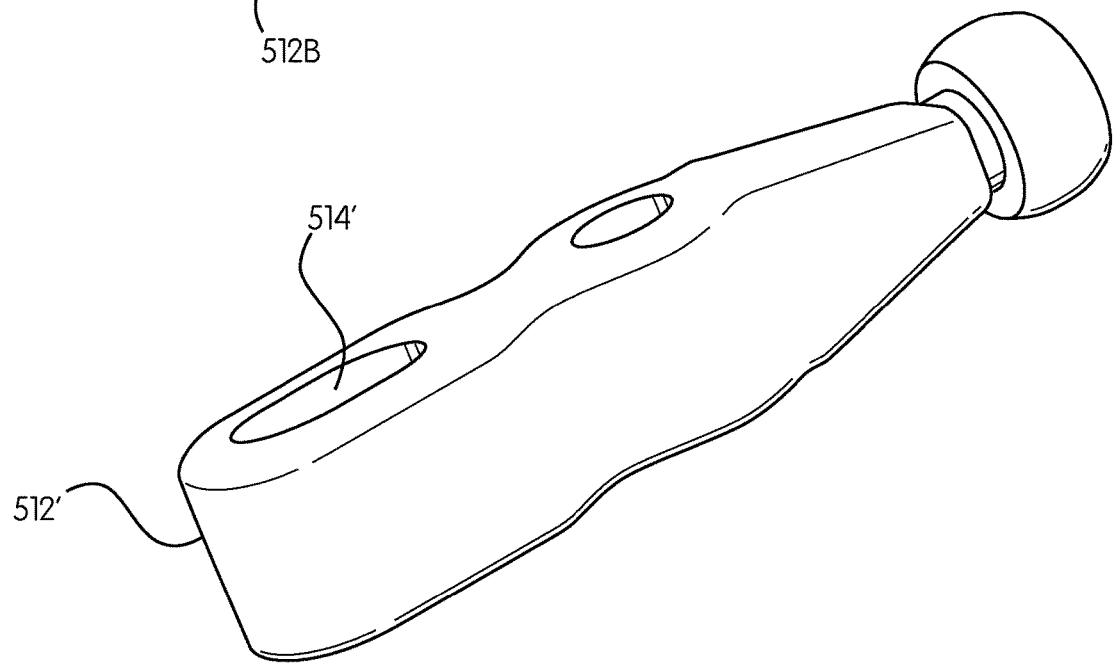
FIG. 5B is a partial perspective view of an alternate embodiment of a wobble arm of the knife drive assembly of FIG. 3.

Alternatively, instead of the pair of spaced apart members 512A, 512B, the first wobble arm 500A can be configured to have a single member 512' as shown in FIG. 5B. The single member 512' would then have an aperture 514' that extends through the top and/or bottom surface of the single member 512'.

The second wobble arm 500B is configured the same as the first wobble arm 500A. However, it is appreciated by those skilled in the art that the first and second wobble arms 500A, 500B do not need to have identical structures.

Figure 6:
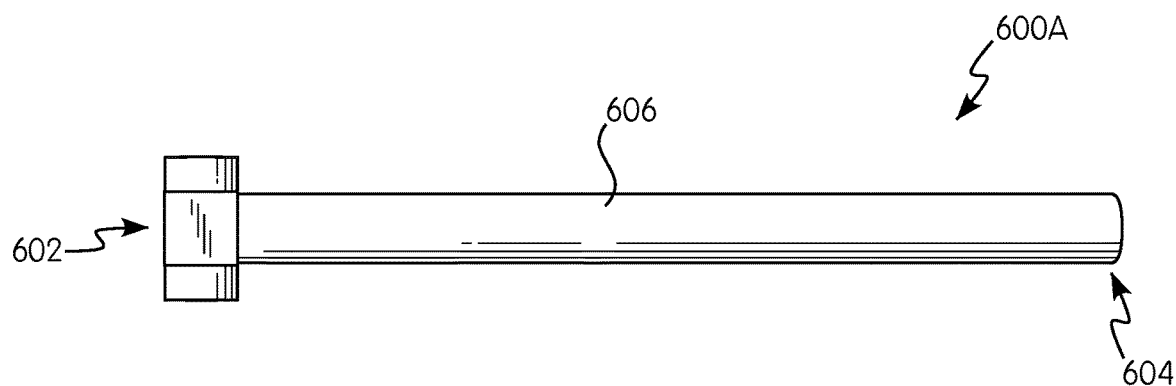
FIG. 6 is a partial perspective view of a mounting bar of the knife drive assembly of FIG. 3.
Figure 7:
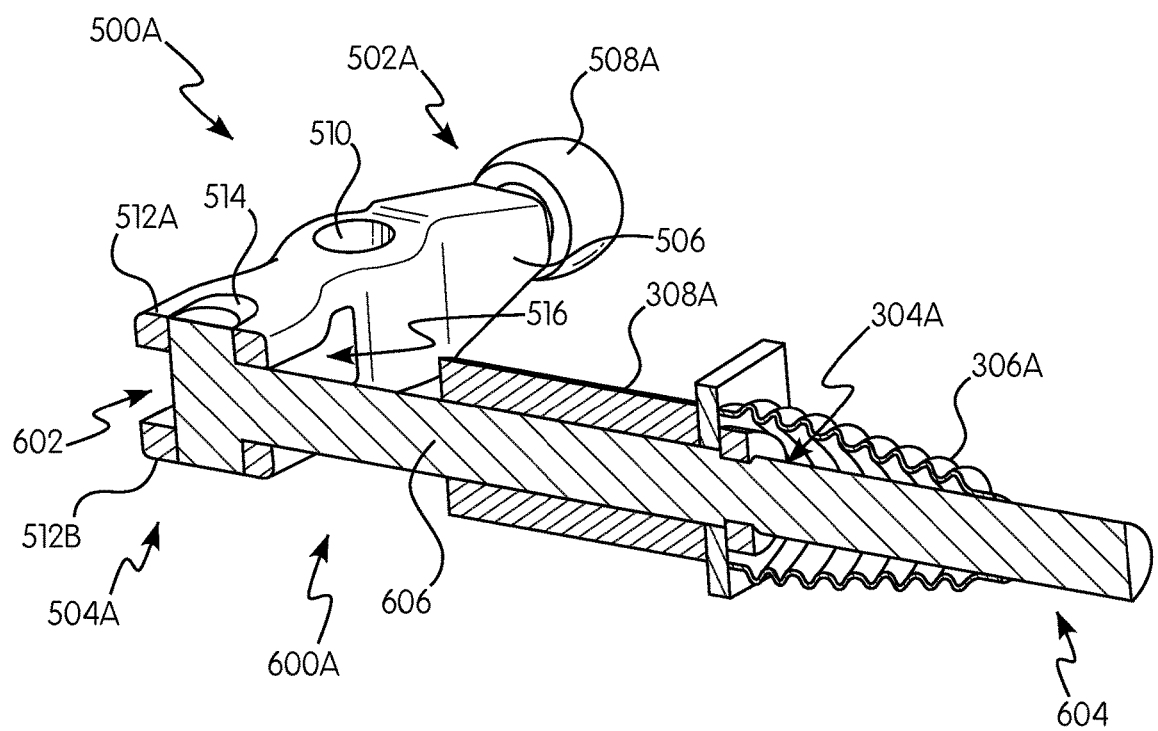
FIG. 7 is a partial perspective view of the knife drive assembly of FIG. 3 with a mounting bar shown in cross section taken along lines B-B.

Referring now to FIGS. 3 and 6, the first mounting bar 600A is configured as shown. The first mounting bar 600A has a first end, or proximal end, 602, a second end 604 and a bar body 606. The first end 602 is designed to connect with the first wobble arm 500A. Preferably, the first end 602 includes a T-shaped end having a substantially cylindrical body configured to pivot with the aperture 514 of the first wobble arm 500A. The first end 602 may terminate inside the first wobble arm 500Am as shown in FIGS. 3 and 7, or may instead extend out through the slot 516 of the wobble arm 500.

The second mounting bar 600B is configured the same as the first mounting bar 600A. However, it is appreciated by those skilled in the art that the first and second mounting bars 600A, 600B do not need to have identical structures With reference now to FIGS. 3 and 7, there is illustrated the assembled knife drive assembly 300 in accordance with the exemplary embodiment of the present invention. The rotatable driver 400 is operatively connected to the driving mechanism 410, such as, for example, by way of a shaft or other linkage that extends through the cylindrical body 408 or is connected thereto. The first end 502A of the first wobble arm 500A is positioned within the first curved channel 402 such that the bearing 508A travels along the travel path 412 of the first curved channel 402. The first wobble arm 500A is pivotally connected to the frame 104 at the pivot 510A by way of, for example, a pivot joint extending through, or connecting to, the pivot 510A.

The first mounting bar 600A is connected to the first wobble arm 500A by its first end 602 mounted within the aperture 514 for movement therein. In other words, the first mounting bar 600A has a longitudinal length that extends into the space between the spaced apart members 512A, 512B such that the first mounting bar 600A and the first wobble arm 500A are slidingly connected by a slotted connection at the aperture 514. In other words, the proximal end 602 of the first mounting bar 600A and the second end 504A of the first wobble arm 500A are slidingly connected by a slotted connection.

The first mounting bar 600A extends through a side of the housing 302 at opening 304A and has its longitudinal length extending substantially parallel to the rotational axis 404 of the rotatable driver 400. Accordingly, the first mounting bar 600A is radially offset from the rotational axis 404. Additionally, the linear bearing 308A is positioned adjacent to the opening 304A inside the housing 302, while the seal 306A is positioned adjacent to and covering the opening 304A from the outside of the housing 302. Therefore, the first mounting bar 600A extends through the housing 302, the linear bearing 308A and the seal 306A.

The second wobble arm 500B, second mounting bar 600B are similarly connected as the first wobble arm 500A and the first mounting bar 600A. Put differently, the first and second mounting bars 600A, 600B each include a proximal end slidingly connected to the respective second end of the first and second wobble arms 500A, 500B by a slotted connection.

It is appreciated by those skilled in the art that the first and second mounting bars 600A, 600B do not necessarily have to be single pieces extending through the housing 302 at the respective openings 304A, 304B, or even necessarily extend through the openings 304A, 304B. They may instead comprise a series of bars and connectors terminating at the first and second cutter bars 202A, 202B. For example, the first mounting bar 600A may terminate adjacent to opening 304A and be immediately connected to the first cutter bar.

Figure 8B:
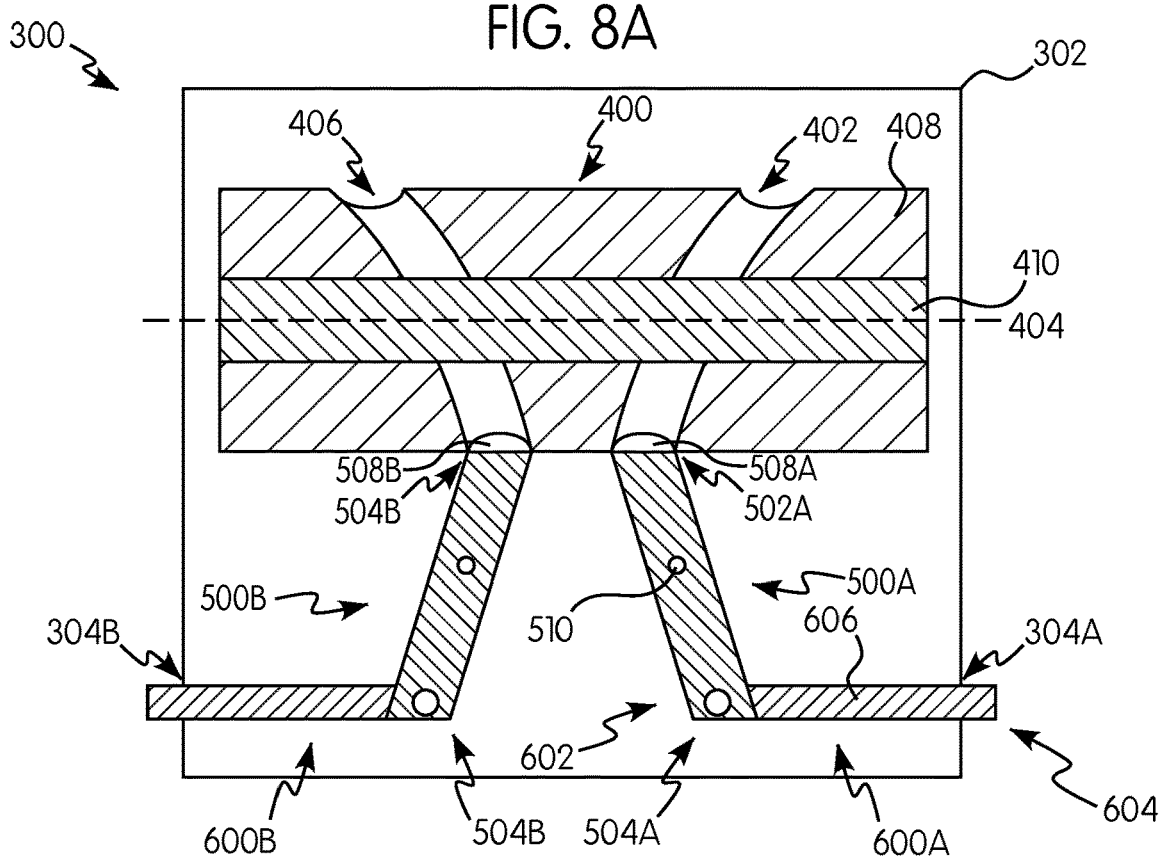
FIG. 8B is an exemplary aspect of the knife drive assembly of FIG. 8A.

Referring now to FIGS. 8A and 8B, during operation, the driving mechanism 410 causes the rotatable driver 400 to rotate about the rotational axis 404. As the rotatable driver 400 rotates, the bearings 508A, 508B of the first and second wobble arms 500A, 500B travel along the first and second curved channels 402, 406. Because of the curved nature of the first and second curved channels 402, 406, the bearings 508A, 508B travel a distance defined by the extent of curvature of the first and second curved channels 402, 406 along a direction parallel to the rotational axis 404 (i.e. from left to right as shown in FIGS. 8A and 8B).

As a result of the bearings 508A, 508B traveling within the first and second curved channels 402, 406, the first and second wobble arms 500A, 500B pivot about their respective pivots 510A, 510B. Put differently, the first wobble arm 500A pivots about an axis located between the first end 502A and the second end 504A of the first wobble arm 500A.

Consequently, the first and second mounting bars 600A, 600B attached to the first and second wobble arms 500A, 500B move in opposite directions to the direction of their respective bearings 508A, 508B. Further, because the first and second curved channels 402, 406 are angularly offset by 180°, the first and second wobble arms 500A, 500B pivot in opposite directions at their pivots 510A, 510B, respectively. Therefore, as shown in FIGS. 8A and 8B, the first and second mounting bars 600A, 600B move in opposite directions to one another in a linear fashion. The linear bearings 308A, 308B facilitate the movement of the first and second mounting bars 600A, 600B, respectfully at or near openings 304A, 304B in only a linear fashion.

It is appreciated that by the nature of the design, the rotational motion of the driving mechanism 410 is transformed into linear reciprocating motion of the first and second mounting bars 600A, 600B in a direction substantially parallel to the rotational axis 404 of the driver.

By being constrained only to linear reciprocating or oscillating motion the mounting bars transmit such linear motion to the cutter bar(s) such that fore and aft cutter bar motion and corresponding vibrations are advantageously eliminated. Additionally, by virtue of the second ends of the first and second connecting members moving in equal and opposite directions, lateral vibration is minimized thereby advantageously resulting in reduced vibration of the knife head assembly.

Figure 9:
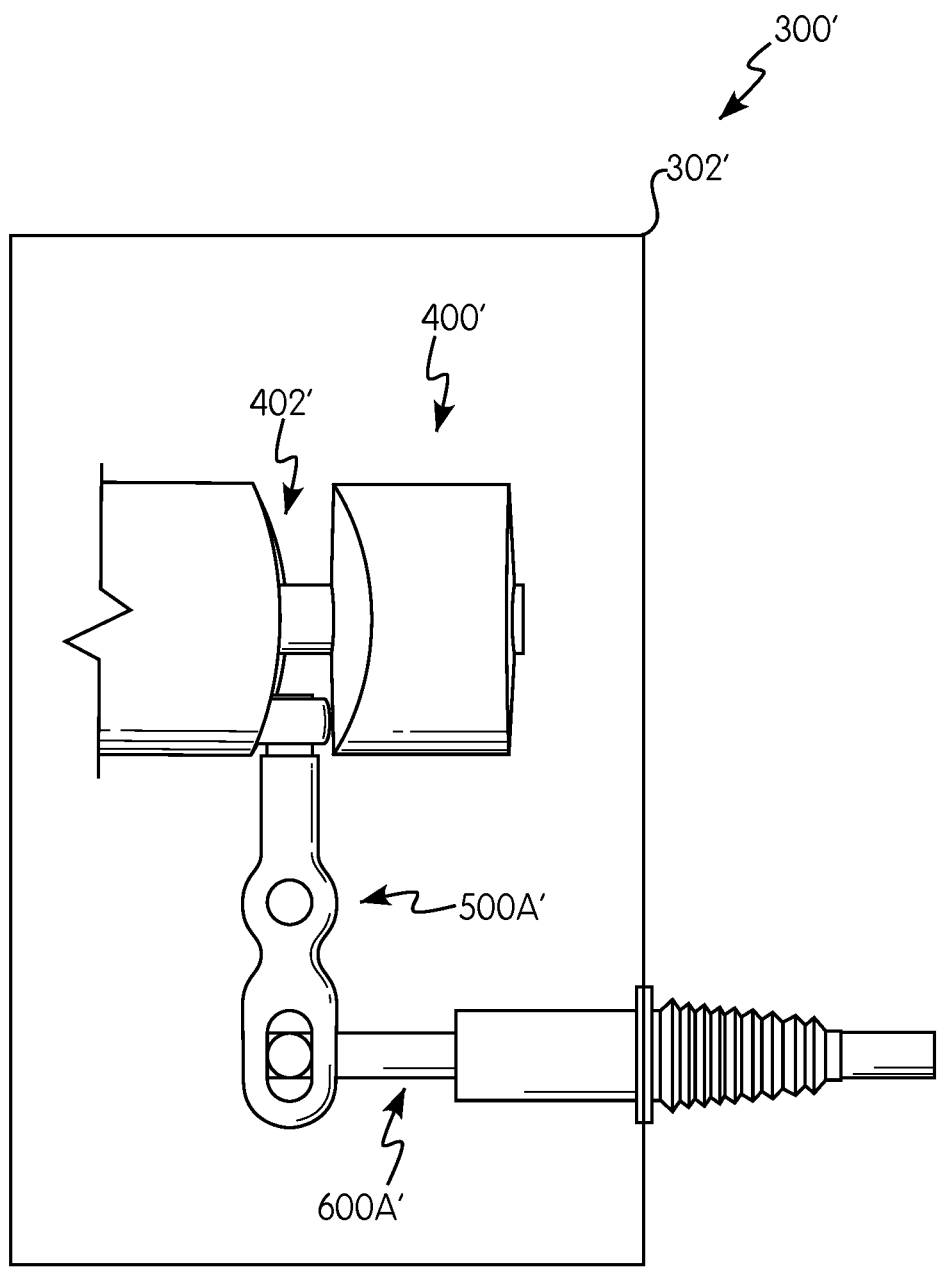
FIG. 9 is a partial perspective view of a knife drive assembly in accordance with another exemplary embodiment of the present invention applicable to the header of FIG. 1.

It can be appreciated by those skilled in the art that while the above references and drawings were made with respect to a centrally located knife drive assembly 300 within a header, the same techniques can be applied to a knife drive assembly 300' located on a side of a header. For example, FIG. 9 shows a second exemplary embodiment of a knife drive assembly 300' for attachment to a right of a header including a housing 302' having a rotatable driver 400' with a single curved channel 402', a single wobble arm 500A' and a single mounting bar 600A'. The knife drive assembly 300' operates in substantially the same way as the knife drive assembly 300 described above but having only the wobble arm 500A and mounting bar 600A. The knife drive assembly 300' can also be configured for attachment to a left side of the header, in which case the knife drive assembly would be configured as a mirror image of that shown in FIG. 9.

It can further be appreciated by those skilled in the art that the second exemplary embodiment can also be utilized as a centrally located knife drive assembly by using two such knife drive assemblies facing opposite directions.

Figure 10A:
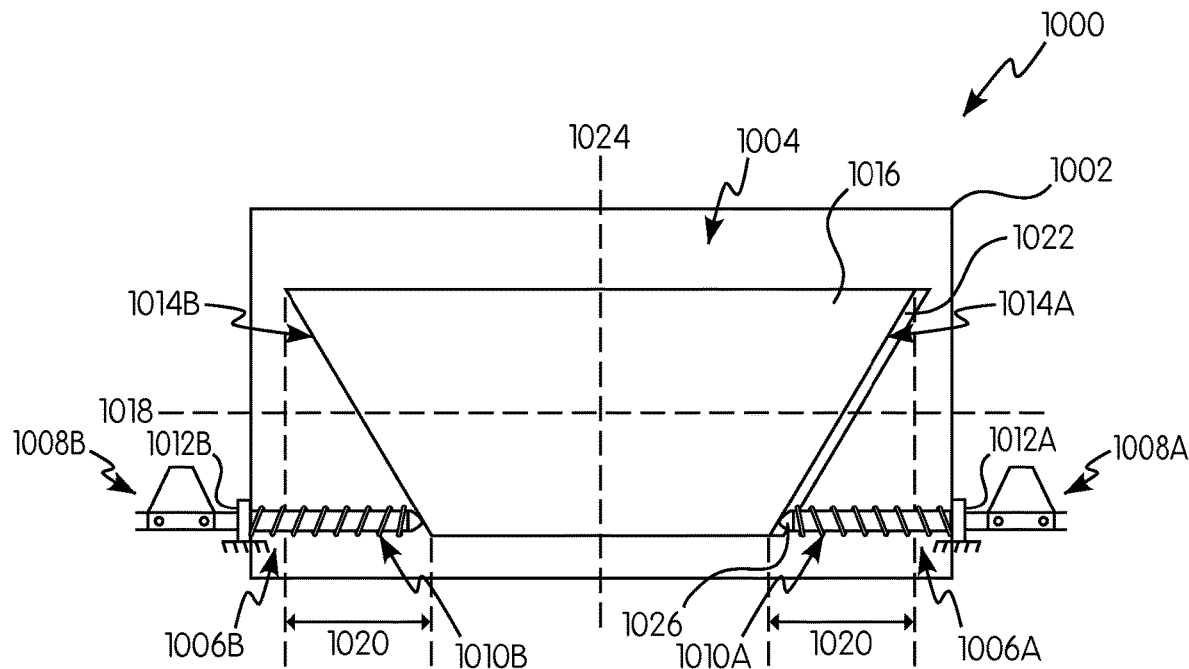
FIG. 10A is a schematic top view of a knife drive assembly in accordance with yet another exemplary embodiment of the present invention applicable to the header of FIG. 1.
Figure 10B:
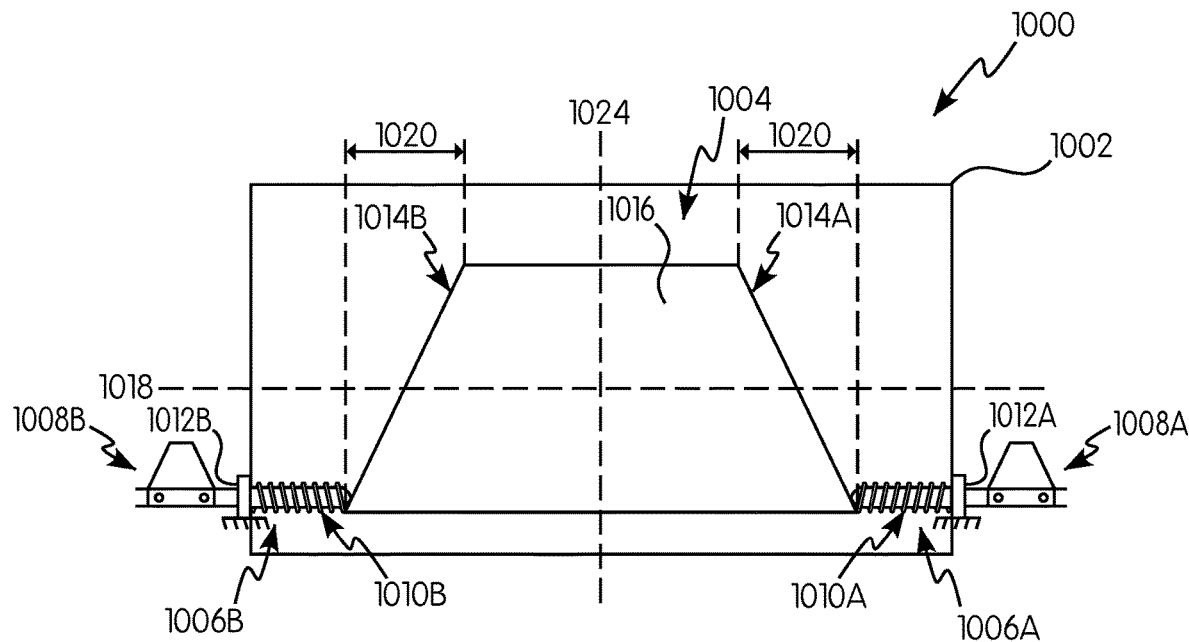
FIG. 10B is another schematic top view of the knife drive assembly of FIG. 10A.

Referring now to FIGS. 10A and 10B, there is illustrated a top perspective view of a third exemplary embodiment in accordance with the present invention that can be used as a centrally located knife drive assembly 1000 of the header. The knife drive assembly 1000 includes a housing 1002, a rotatable driver 1004, a first mounting bar 1006A, a second mounting bar 1006B, a first cutter bar 1008A and a second cutter bar 1008B.

The housing 1002 is similar to the housing 302 and herein incorporates the same components where applicable. Additionally, the housing 1002 can include biasing members 1010A, 1010B and optional stops 1012A, 1012B. The biasing members 1010A, 1010B are attached to the first and second mounting bars 1006A, 1006B and a respective stop 1012A, 1012B. The biasing members 1010A, 1010B are each, in a preferred aspect, a compression spring but may alternatively be any other biasing member capable of creating a return force between the housing 1002 and the first and second mounting bars 1006A, 1006B. Put differently, the knife drive assembly 1000 further comprises a biasing member 1010A biasing the first mounting bar 1006A towards a first sloped lateral side 1014. The stops 1012A, 1012B may be a separate element or may be incorporated into or part of the housing 1002 through which a shaft, such as first mounting bar 1006A, extends through or adjacent to. In other words, the housing 1002 includes a stop 1012A adjacent to the first mounting bar 1006A engaging the biasing member 1010A. The knife drive assembly 1000 can further comprise a seal between the first mounting bar 1006A and the housing 1002, similar to the seal 306A described above.

The rotatable driver 1004 is configured as shown in FIG. 10A. The rotatable driver 1004 includes a cylindrical body 1016 operatively connected to a driving mechanism 1200. The cylindrical body 1016 includes a first sloped lateral side 1014A and a second sloped lateral side 1014B that each traverse the rotational axis 1018 at an angle of anywhere between about thirty to sixty degrees. It is to be appreciated however, that the cylindrical body 1016 may be any other shape as appropriate for having sloped lateral sides and being able to rotate, and that the angle may be anywhere from 5° to 85°. It is also appreciated that the first and second sloped lateral sides 1014A, 1014B do not need to be sloped at the same angle. Preferably, the sloped lateral sides 1014A, 1014B have a longitudinal extent 1020 extending of about 3 inches that extends parallel to the rotational axis 1018. It is understood, however, that it is not necessarily limited to 3 inches.

The sloped lateral sides 1014A, 1014B can include an optional bearing surface 1022, bushing, or groove that engages first and second mounting bars 1006A, 1006B. FIG. 10A illustrates the first sloped lateral side 1014A having the bearing surface 1022. However, both the first and second sloped lateral side 1014A, 1014B can alternatively include the bearing surface 1022. The bearing surface 1022 may be formed, for example, from a composite, such as a ceramic, or a metal. In other words, the rotatable driver 1004 includes a bearing surface 1022 on the first sloped lateral side 1014A.

Additionally, it can be appreciated by those skilled in the art that the first and second sloped lateral sides 1014A, 1014B do not need be planar. For example, the rotatable driver 1004 can have a cylindrical body 1016 that has one or more apertures or protrusions extending parallel to the rotational axis 1018 through either or both the first or second slope lateral side 1014A, 1014B. In one embodiment, the cylindrical body 1016 may have an aperture extend through the first and second sloped lateral sides 1014A, 1014B thereby making the first and second sloped lateral sides 1014A, 1014B rings circumscribing the aperture.

Preferably, the second sloped lateral side 1014B is symmetric to the first sloped lateral side 1014A about a sagittal plane 1024 transverse to the rotational axis 1018. In other words, the first and second sloped lateral sides 1014A, 1014B are substantially symmetric with each other about a sagittal plane 1024 transverse to the rotational axis 1018. However, in an alternate embodiment illustrated in FIGS. 11A and 11B, the second sloped lateral side 1014B' may be parallel to the first sloped lateral side 1014A. In other words, the second sloped lateral side 1014B' is substantially parallel to the first sloped lateral side 1014A. Additionally, it can be appreciated by those skilled in the art that the first and second sloped lateral sides 1014A, 1014B' do not need be planar, similar to the embodiment described above with respect to the first and second sloped lateral sides 1014A, 1014B.

Figure 12A:
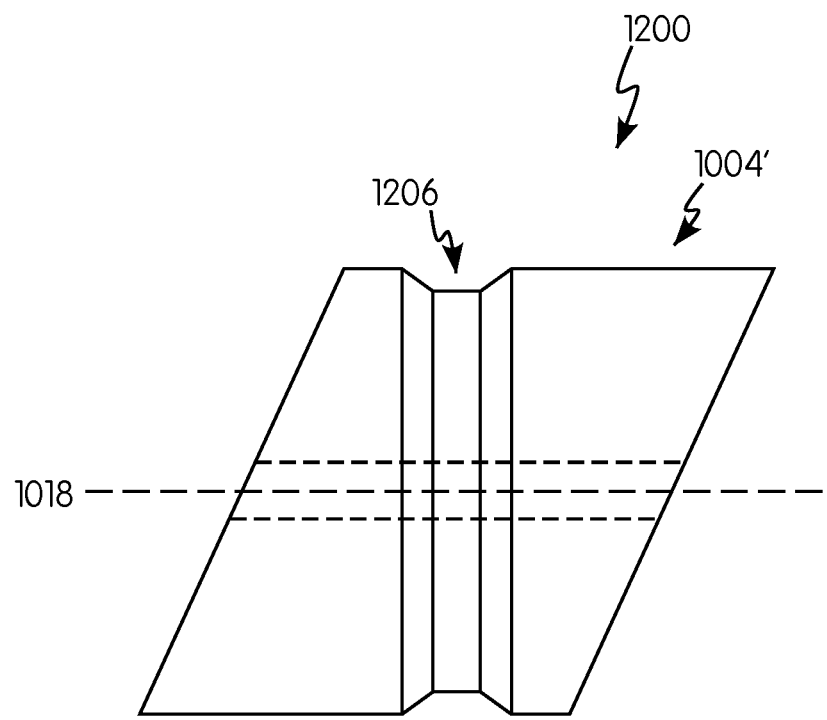
FIG. 12A is a schematic top view of a knife drive assembly in accordance with another exemplary embodiment of the present invention.
Figure 12B:
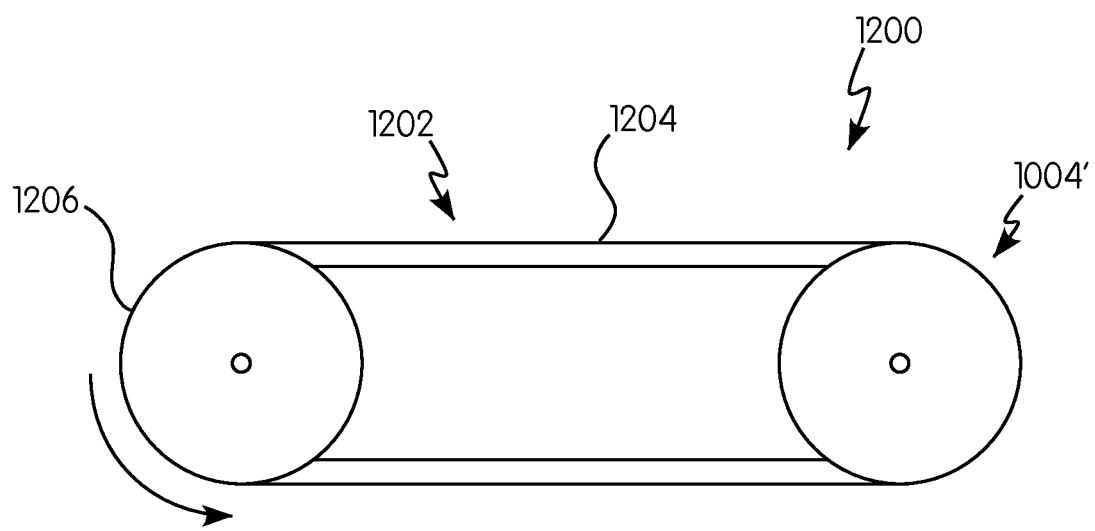
FIG. 12B is a schematic side view of the knife drive assembly of FIG. 12A assembled with a drive sheave.

The rotatable driver 1004 is operatively connected to the drive mechanism 1200 that is capable of rotating the rotatable driver 1004 about its rotational axis 1018. The drive mechanism 1200 may be, for example, a motor, power take-off or other such sources capable of generating rotational motion similar to the one described above as driving mechanism 410. Referring now to FIGS. 12A and 12B, the drive mechanism 1200 can be, for example, a pulley system 1202. The pulley system 1202 can include a pulley 1204 attached to the rotatable driver 1004' at the channel 1206, which can be incorporated into the cylindrical body 1016 of the rotatable driver 1004, to drive rotational movement about the rotational axis 1018. The pulley system 1202 can also be attached to a drive sheave 1206 for generating the rotational motion. In other words, the knife drive assembly 1000 further comprises a mechanical drive for rotating the rotatable driver 1004, wherein the mechanical drive is a pulley 1204 or a motor operatively connected to the rotatable driver 1004.

Referring back to FIGS. 10A and 10B, both or only one of the first and second mounting bars 1006A, 1006B can also include a bearing 1026 for engaging the first and/or sloped lateral side 1014A, 1014B. The bearing 1026 can be a planar, curved or rounded bearing formed of, for example, a composite such as a ceramic, a metal, a polymer, such as a hard plastic, or other similar materials. For all other intents and purposes, the first and second mounting bars 1006A, 1006B are configured substantially the same as the first and second mounting bars 600A, 600B. In other words, the first mounting bar 1006A includes a proximal end having a bearing 1026 for engaging the first sloped lateral side 1014A.

With reference now to FIGS. 10A and 10B, there is illustrated an assembled knife drive assembly 1000. As shown, the rotatable driver 1004 is operatively connected to the driving mechanism, like the driving mechanism 1200, for providing rotary motion. The bearing surface 1022 of the first mounting bar 1006A engages the first sloped lateral side 1014A at a location radially offset from the rotational axis 1018. The first mounting bar 1006A has a longitudinal length that extends through the housing 1002, adjacent the stop 1012A and parallel to the rotational axis 1018. In an alternate embodiment, the first mounting bar 1006A may extend in a direction angularly offset from the rotational axis 1018. Connected to the first mounting bar 1006A is the biasing member 1010A inside the housing 1002. Connected to an end of the first mounting bar 1006A outside or adjacent to the housing 1002 is the first cutter bar 1008A.

The second mounting bar 1006B is configured and assembled in substantially the same way as the first mounting bar 1006A but connected instead to the second sloped lateral side 1014B and extends through the stop 1012B. In accordance with an exemplary aspect, the first and second mounting bars 1006A, 1006B are located on the same plane parallel to the rotational axis 1018.

Figure 11:
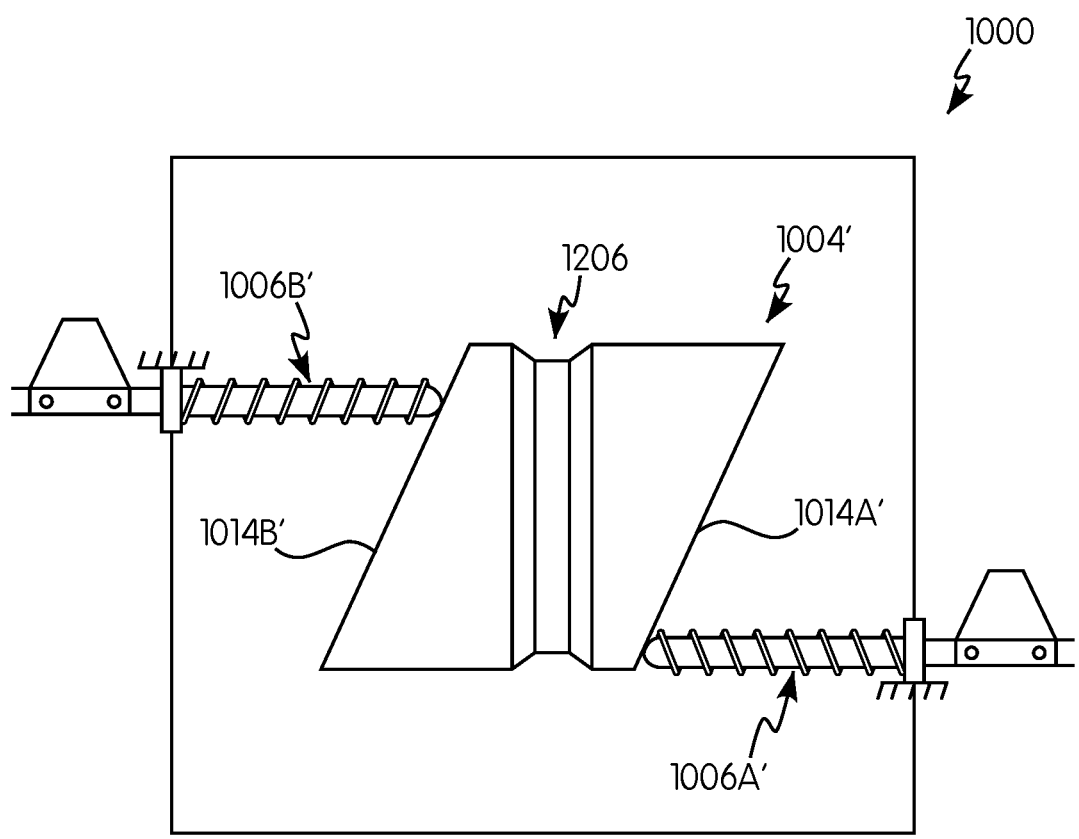
FIG. 11 is a schematic top view of a knife drive assembly in accordance with yet another exemplary embodiment of the present invention applicable to the header of FIG. 1.

In another exemplary embodiment, as shown in FIG. 11, the first and second mounting bars 1006A, 1006B' are located on separate planes parallel to the rotational axis 1018.

As can be seen by comparison between FIGS. 10A and 10B, as the driving mechanism 1200 is engaged, the rotatable driver 1004 rotates about rotational axis 1018. As the rotatable driver 1004 rotates, the ends of the first and second mounting bars 1006A, 1006B that engage the first and second sloped lateral sides 1014A, 1014B, such as bearing 1026, slide on the respective first and second sloped lateral sides 1014A, 1014B. Consequently, the first and second mounting bars 1006A, 1006B are pushed away from the rotatable driver 1004 a distance of about 3 inches. Therefore, the first and second mounting bars 1006A, 1006B are pushed through the housing 1002. Accordingly, the cutter bars 1008A, 10088 attached to the respective ends of the first and second mounting bars 1006A, 1006B oscillate as the rotatable driver 1004 rotates.

Additionally, the inclusion of linear bearings in, for example in the stops 1012A, 1012B, ensures that the cutter bars 1008A, 10088 engage in only linear motion. Furthermore, as a result of having two sloped lateral sides 1014A, 1014B, the respective first and second mounting bars 1006A, 1006B oscillate in opposite directions to one another, thereby reducing vibratory motion further.

Figure 13:
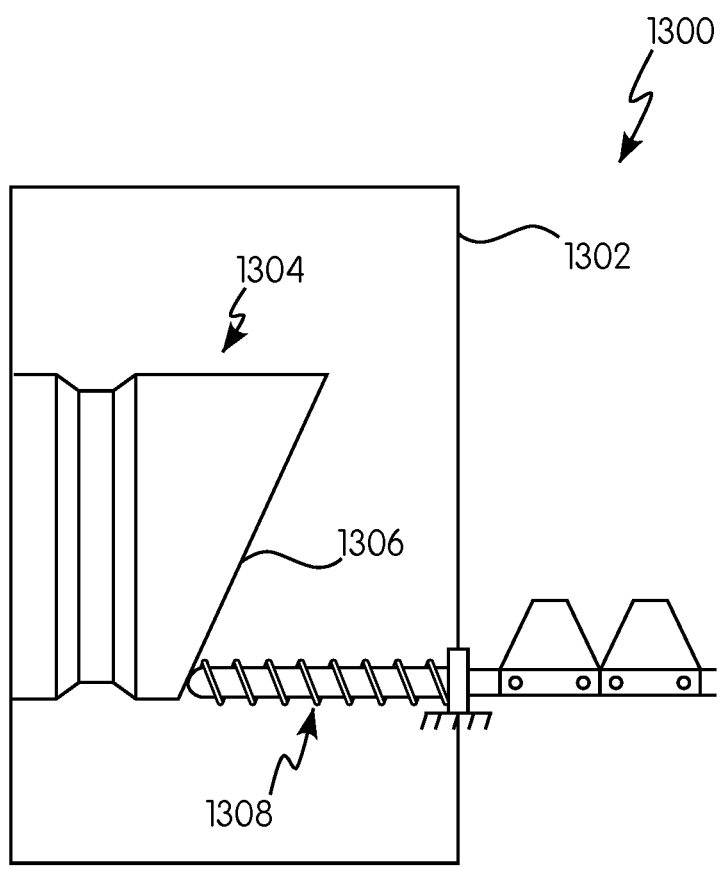
FIG. 13 is a schematic top view of a knife drive assembly in accordance with yet another exemplary embodiment of the present invention applicable to the header of FIG. 1.

It can be appreciated by those skilled in the art that while the above references and drawings were made with respect to a centrally located knife drive assembly 1000 within a header, the same techniques can be applied to a knife drive assembly located on a side of a header. For example, FIG. 13 shows a fourth exemplary embodiment of a knife drive assembly 1300 within a housing 1302 having a rotatable driver 1304 with a single sloped lateral side 1306, and a single mounting bar 1308. For all intents and purposes, this embodiment operates in substantially the same was as described above with respect to similar structures of the knife drive assembly 1000.

It can further be appreciated by those skilled in the art that the knife drive assembly 1300 can also be utilized as a centrally located knife drive by using two knife drive assemblies 1300 facing opposite directions.

While the present invention has been described with reference to exemplary embodiments, it will be appreciated by those skilled in the art that various changes may be made and equivalents may be substituted for elements thereof without departing from the scope of the present invention. For example, features described in one embodiment may be incorporated into a different embodiment, such as connections to a frame of the header and the use of a biasing and stopping member, or a combination of channels circumscribing a rotational axis and a sloped lateral side.

In addition, modifications may be made to adapt a particular situation or material to the teachings of the present invention without departing from the essential scope thereof. For example, the headers and knife drives may only utilize a single cutter blade or two or more cutter blades, or be located centrally to the header or on the side of the header, the rotatable drivers may be non-uniformly shaped, the first side/channel and the second side/channel may have varying angles from each other or the components of the knife drive and knife head assemblies may be either within a housing or not. It is to be understood, therefore, that the present invention not be limited to the particular aspects or exemplary embodiments disclosed, but it is intended to cover modifications within the spirit and scope of the present invention as defined by the appended claims.

We claim:

1. A knife drive assembly for an agricultural harvester header comprising:
    a housing;
    a rotatable driver within the housing, the rotatable driver including a first curved channel circumscribing the rotatable driver about a rotational axis of the rotatable driver;
    a first wobble arm within the housing, the first wobble arm including a first end engaging the first curved channel and a second end opposite the first end, and a pivot between the first and second ends of the first wobble arm; and
    a first mounting bar spaced from the rotatable driver including:
        a proximal end slidingly connected to the second end of the first wobble arm near the proximal end,
        wherein the first mounting bar has a first longitudinal length extending substantially parallel to the rotational axis and through the housing, and
        wherein rotation of the rotatable driver causes reciprocating motion of the first mounting bar.

2. The knife drive assembly of claim 1, wherein the proximal end of the first mounting bar and the second end of the first wobble arm are slidingly connected by a slotted connection.

3. The knife drive assembly of claim 1, wherein the first end of the first wobble arm comprises a roller bearing.

4. The knife drive assembly of claim 1, wherein the first wobble arm pivots about the pivot along an axis transverse to a longitudinal axis of the rotatable driver.

5. The knife drive assembly of claim 1, further comprising a first linear bearing engaging the first mounting bar.

6. The knife drive assembly of claim 1, further comprising a seal between the first mounting bar and the housing.

7. The knife drive assembly of claim 1, further comprising:
   a second curved channel circumscribing the rotatable driver;
   a second wobble arm within the housing, the second wobble arm including a first end engaging the second curved channel and a second end opposite the first end; and
   a second mounting bar spaced from the rotatable driver and engaging the second end of the second wobble arm, wherein the second mounting bar has a second longitudinal length extending substantially parallel to the rotational axis and through the housing and wherein rotation of the rotatable driver causes reciprocating motion of the second mounting bar.

8. The knife drive assembly of claim 7, wherein the second curved channel defines a curved path having a bend that is angularly offset from a bend in a curved path of the first curved channel by about 180 degrees to induce oscillating movement of the first mounting bar and second mounting bar in opposite directions.

9. The knife drive assembly of claim 1, wherein the pivot includes a through-hole.

10. The knife drive assembly of claim 1, wherein the pivot is positioned at about a mid-point between the first end and the second end of the first wobble arm.

11. The knife drive assembly of claim 1, wherein the first wobble arm has a longitudinal axis having an angle relative to a longitudinal axis of the rotatable driver that varies as the first wobble arm engages and travels along the first curved channel.

12. A header for a plant cutting machine comprising:
   a frame;
   a knife drive assembly including:
      a housing mounted to the frame,
      a rotatable driver having:
         a first curved channel circumscribing the rotatable driver about a rotational axis of the rotatable driver, and
         a second curved channel circumscribing the rotatable driver about the rotational axis,
      a first wobble arm pivotably attached to the frame, the first wobble arm including a first end engaging the first curved channel and a second end opposite the first end, and a pivot between the first and second ends of the first wobble arm,
      a second wobble arm pivotably attached to the frame, the second wobble arm including a first end engaging the second curved channel and a second end opposite the first end,
      a first mounting bar spaced from the rotatable driver and engaging the second end of the first wobble arm, wherein the first mounting bar has a first longitudinal length extending substantially parallel to the rotational axis and through the housing, and
      a second mounting bar spaced from the rotatable driver and engaging the second end of the second wobble arm, wherein the second mounting bar has a second longitudinal length extending substantially parallel to the rotational axis and through the housing,
      wherein rotation of the rotatable driver causes reciprocating motion of the first and second mounting bars;
   a first cutter bar attached to the first mounting bar; and
   a second cutter bar attached to the second mounting bar.

13. The header of claim 12, wherein the first and second mounting bars each include a proximal end slidingly connected to the respective second end of the first and second wobble arms by a slotted connection.

14. The header of claim 12, wherein the pivot includes a through-hole.

15. The header of claim 12, wherein the pivot is positioned at about a mid-point between the first end and the second end of the first wobble arm.

16. The header of claim 12, wherein the first wobble arm has a longitudinal axis having an angle relative to a longitudinal axis of the rotatable driver that varies as the first wobble arm engages and travels along the first curved channel.

* * * * *